United States Patent [19]

Chum

[11] Patent Number: 4,710,924
[45] Date of Patent: Dec. 1, 1987

[54] LOCAL AND REMOTE BIT ERROR RATE MONITORING FOR EARLY WARNING OF FAULT LOCATION OF DIGITAL TRANSMISSION SYSTEM

[75] Inventor: Stanley Chum, Union City, Calif.

[73] Assignee: GTE Sprint Communications Corp., Mountain View, Calif.

[21] Appl. No.: 777,802

[22] Filed: Sep. 19, 1985

[51] Int. Cl.⁴ .................. H04L 1/00; G06F 11/10
[52] U.S. Cl. ................................ 371/4; 370/14; 371/5; 371/22; 379/4
[58] Field of Search ............ 371/4, 5, 22; 370/14, 370/16; 179/175.3 F, 175.3 S, 175.31 R; 379/4, 26

[56] References Cited

U.S. PATENT DOCUMENTS

| | | | |
|---|---|---|---|
| 3,916,379 | 10/1975 | Dulaney et al. | 371/5 |
| 3,928,830 | 12/1975 | Bellamy et al. | 371/4 |
| 4,022,988 | 5/1977 | Lentz et al. | 179/175.31 R |
| 4,122,358 | 10/1978 | Altmann | 371/5 |
| 4,490,817 | 12/1984 | Turner | 371/5 X |
| 4,604,745 | 8/1986 | Takasaki et al. | 371/22 |

Primary Examiner—Charles E. Atkinson
Attorney, Agent, or Firm—Flehr, Hohbach, Test, Albritton & Herbert

[57] ABSTRACT

In-service line monitoring apparatus to detect and isolate marginal and failed digital transmission equipment within a digital telecommunication system having at least two end terminals. At selected terminal and repeater locations, a digital error detector monitors the bit error rate for each location. The detected BER is truncated to include at least the most significant digit and the exponent of the BER. The truncated BER is stored and then encoded for transmission back to the command center usually located at an end terminal. At the one end terminal the encoded BER is stored and displayed upon request. By being able to monitor the truncated BER at any location or direction, maintenance personnel are able to determine when a link in the system begins to deteriorate well before a complete path failure occurs.

14 Claims, 1 Drawing Figure

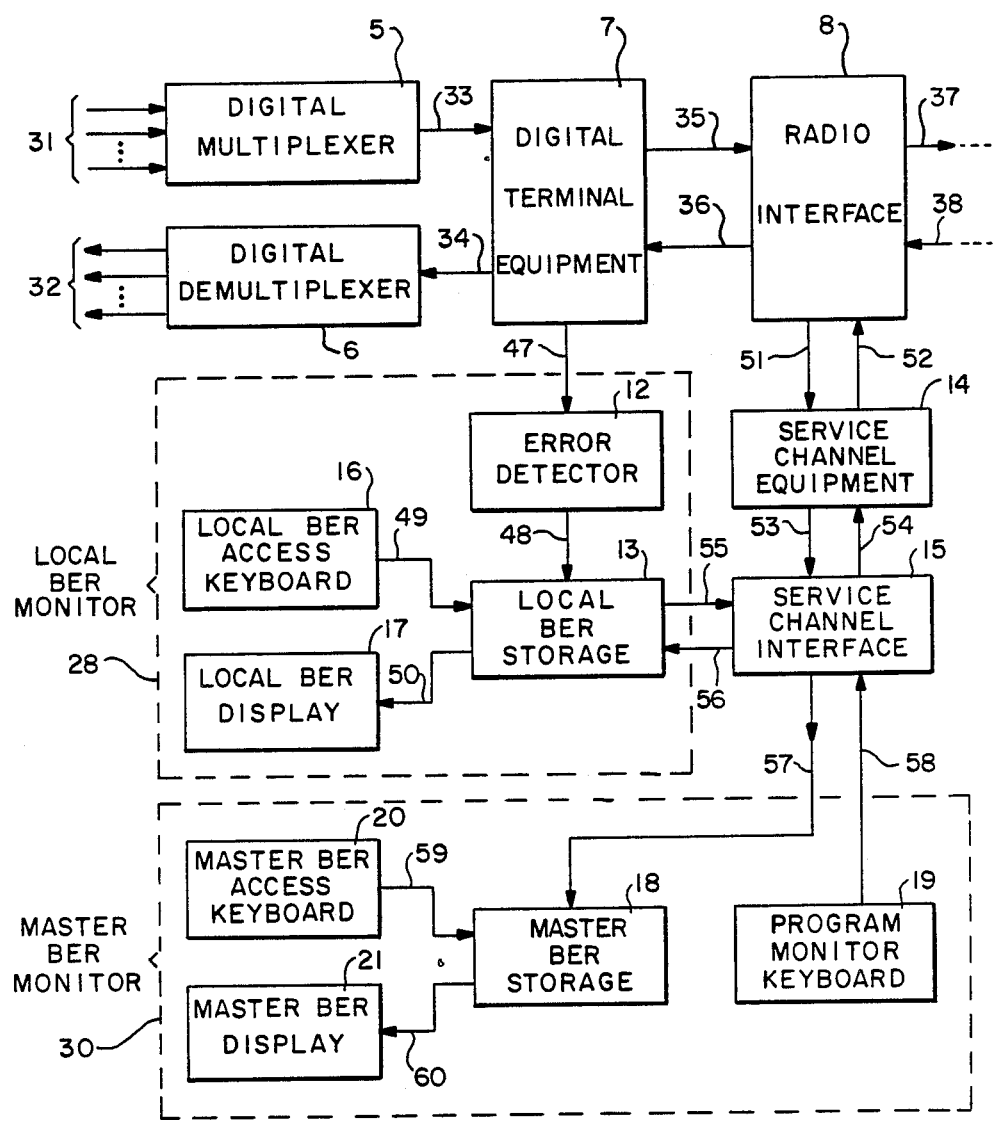
WEST TERMINAL 1
FIG. — 1A

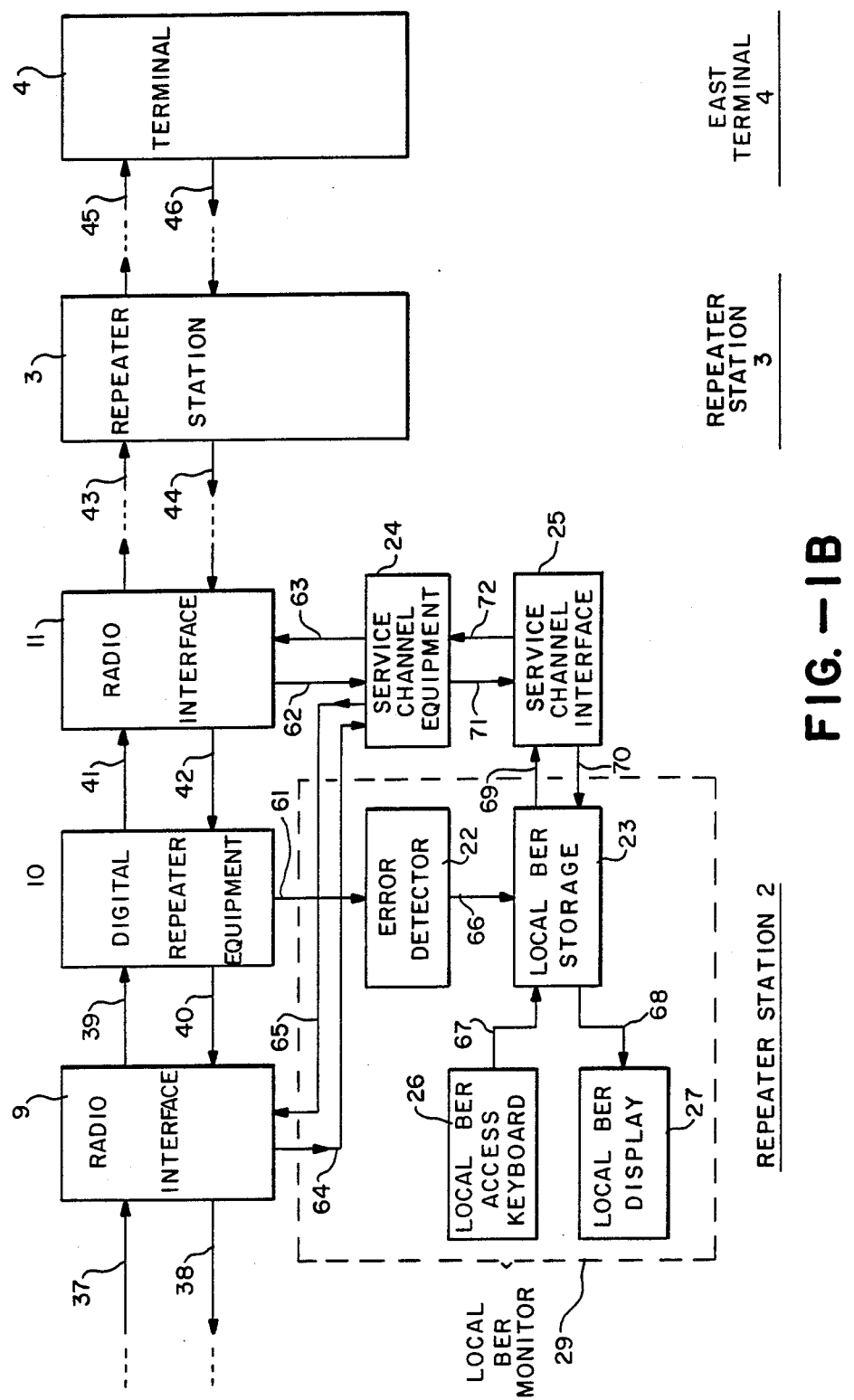
FIG.—1B

LOCAL AND REMOTE BIT ERROR RATE MONITORING FOR EARLY WARNING OF FAULT LOCATION OF DIGITAL TRANSMISSION SYSTEM

BACKGROUND OF THE INVENTION

1. Field of the Invention

This invention relates to digital telecommunication systems and more particularly to an in-service line monitoring scheme to detect and isolate marginal and failed digital repeatered sections in a digital transmission system.

This patent application is related to application Ser. No. 777,803, filed Sept. 19, 1985, and assigned to the same assignee as the present application.

2. Background Description

Digital error detectors, spaced along a digital repeatered transmission system, usually detect errors by detecting coding violations in the digital line signal. The number of coding violations in any given period of time can be and usually is translated into a bit error rate (BER). The BER is a measure of error density, i.e. number of errors/the total number of bits measured. For example, a BER of $1 \times 10^{-7}$ would indicate an error every 10 million bits measured. The BER is a very meaningful measure of the performance of a digital transmission system. And, it is an excellent maintenance and diagnostic tool since anything which may affect the quality of the transmitted signal will affect the BER.

Error detectors monitor the operation of each span in a digital system by checking the BER. Such detectors usually have an internal alarm threshold level setting (often $1 \times 10^{-5}$ or $1 \times 10^{-4}$). When this BER is exceeded, an alarm indicative of unacceptable transmission is sent back to a master station over a return path service channel of the transmission system. In fully redundant systems, the alarm signal causes the system to take appropriate action automatically by switching the effected traffic to a spare link or by otherwise removing the failed span from service.

While this technique is effective, there are inherent drawbacks. The alarm condition is reported only after the system transmission quality deteriorates beyond acceptable limits. Thus, the BER information transmitted prior to the alarm signal may itself be faulty unless the failure has occurred in only one direction. Further, once the system deteriorates to unacceptable limits, maintenance personnel must proceed step-by-step to locate the specific link or maintenance section in the repeatered system that has failed. It would be preferable to determined when the transmission path has deteriorated some amount less than catastropic failure and to then correct the problem or effect a transfer of the communication circuits before the system goes into alarm and shuts down. Merely lowering the alarm threshold level is a poor solution. Although it would detect a developing service problem, it would not be able to detect if the system deteriorates to the point of catastropic system failure. Thus it is an object of this invention to be able to detect when a complete system failure occurs and also to detect, prior to a path failure, when a system is deteriorating and to isolate that specific deteriorating link.

SUMMARY OF THE INVENTION

The present invention provides in-service line monitoring apparatus to detect and isolate marginal and failed digital transmission equipment within a digital telecommunication system having at least two end terminals. At selected terminal and repeater locations, a digital error detector monitors the bit error rate for each location. The detected BER is truncated to include at least the most significant digit and the exponent of the BER. The truncated BER is encoded for transmission back to the command center usually located at an end terminal. At the one end terminal the encoded BER is stored and displayed upon request. By being able to monitor the truncated BER, maintenance personnel are able to determine when a link in the system begins to deteriorate well before a complete path failure occurs. And, in a system with multiple repeatered sections, the ability to determine the approximate BER of each repeatered section permits maintenance personnel to immediately determine which section is deteriorating or has failed.

BRIEF DESCRIPTION OF THE DRAWINGS

For a better understanding of the invention as well as other objects and further features thereof, reference is made to the following description which is to be read in conjunction with the accompanying drawings wherein:

FIG. 1 is a block diagram generally illustrating a digital repeatered transmission system, including a West Terminal (1), intermediate repeater stations (2 and 3) and an East Terminal (4), and more specifically illustrating the service channel and BER detection elements at a master location and a slave location.

DETAILED DESCRIPTION OF THE INVENTION

Referring now to FIG. 1, a digital transmission system is generally shown along with error monitoring apparatus which illustrates the instant invention. West Terminal 1 consists of a PCM (pulse code modulation) carrier digital multiplexer 5, a digital demultiplexer 6, a digital terminal 7, and a transmitter/receiver microwave radio system 8. Although a microwave radio system is illustrated, the instant invention is applicable to any digital transmission system having a bit error rate monitor, and therefore, an optical fiber system could be used, as opposed to the microwave radio link shown (if the appropriate changes were made to the digital transmission carrier equipment). Intermediate repeater stations 2 and 3 may consist of straight through repeaters (as shown in FIG. 1.), drop repeaters, or a terminating office with some through channels to another end office such as East Terminal 4. East Terminal 4 is equivalent to the structure shown as West Terminal 1 (except that East Terminal 4 does not have the master BER monitor equipment 30). Connecting the two end terminals 1 and 4 with through repeaters 2 and 3 are microwave links 37 and 38, 43 and 44, and 45 and 46. These links and the associated equipment are illustrated and described as single radio channels; however, in practice multiple channels are commonly used with standby channels available for protection purposes (e.g. a 1-for-5 protection system).

West Terminal 1 accepts a plurality of digital channels (such as T1 line signals) via input paths 31 and conditions the signals for transmission over (W-E) path 37 to intermediate repeater stations 2 and 3. In addition West Terminal 1 processes the signals received over (E-W) microwave path 38 and provides a plurality of digital channels on output paths 32 corresponding to the channels on input paths 31. The receiver portion of microwave radio 8 demodulates the microwave signals from repeater 2, and separates the service channel signals out on path 51 from the remaining baseband signals applied to path 36. The transmitter portion of microwave radio 8 combines the digital baseband signals on path 35 with the outgoing service channel signals on path 52 and modulates the entire band of signals to microwave frequencies for transmission over the microwave path 37. The digital terminal equipment 7 provides the basic common digital channel functions for the digital transmission system (such as level coordination, alarm functions, etc.) The remaining functions, shown as part of West Terminal 1, consist of the alarm and control functions which are often considered to be, along with the service channel equipment 14, part of the microwave radio interface. These error alarm and control functions are provided by the local BER monitor equipment 28, the master BER monitor equipment 30, and the service channel facilities 14 and 15. The service channel equipment 14 provides the drop and insert capability to properly interface the order wire, signalling, alarm functions, and user data with the digital baseband signals in the microwave radio 8. The input and output connections to the service channel equipment 14 for the bulk of these "ancillary" service channel functions are not shown since these functions, while important transmission system functions, are irrelevant to an understanding of the present invention. The service channels signals of interest, that is the error alarm and control output signals, appear on path 53 while the input signals are on path 54.

The program monitor keyboard 19, which is part of the master BER monitor equipment 30, is the command center for the BER monitoring function. More precisely, it provides via path 58 address and command information for the "local" BER monitoring equipment located at each of the repeaters and terminals in the transmission system and for each transmission direction, i.e. E-W and W-E. The output signals from program monitor keyboard 19 couple through the service channel interface equipment 15. Functionally interface equipment 15 encodes the command signal on path 58 (or decodes the response signal on path 51) from an 8-bit parallel byte into a serial bit stream signal. The encoded address and command information to the intermediate stations 2 and 3 is sent, via the service channel facility over paths 54, 52, and 37. Program monitor keyboard 19 usually has both a manual mode of operation and an automatic or scan mode. In the scan mode is sequentially addresses each intermediate station and terminal for each direction. When the local BER monitor equipment at an intermediate station or terminal is addressed, the current BER information at that station is encoded and transmitted back to the master station monitor equipment 30 at West Terminal 1.

The master BER storage unit 18 is a digital memory unit that holds the latest BER information from each intermediate station and terminal. For multiple radio systems, storage unit 18 stores the BER data for each radio channel and direction as well as for each location. The stored BER data is updated each time a new BER signal is received. The master BER access keyboard 20 may be a standard keycircuit electrically connected to the master BER store 18 so that the entry of an appropriate command from the keyboard 20 will cause the current BER information for the selected station, channel, and direction to be visually displayed on the master BER display 21. The master BER storage unit 18 may be set up to continuously provide a visual display on the master BER display 21 of the bit error rate from each station, or alternatively, may retain the bit error rate in memory for each station for visual display only on command.

The BER information is generated by each local BER montor equipment (shown in FIG. 1 as 28 and 29) and prepared for transmission to the master BER monitor equipment 30. In this example the West Terminal 1 is considered to be the master terminal; however, the East Terminal 4 or any intermediate station could also be used as the master terminal. At the intermediate station 2, the incoming microwave signals appearing on path 37 are received, demodulated, and demultiplexed by microwave radio 9 and then applied to the digital line repeater 10. The line repeater 10 regenerates and passes the digital channels on to a East microwave T/R 11 for transmission to a second repeater station 3 and then to East Terminal 4. A portion of the digital line signal is applied on path 61 to a standard error detector 22 which computes the BER from the detected data errors. The BER number provided by the error detector 22 is a number such as $1.546 \times 10^{-7}$ errors/second. Instead of applying this BER to a threshold detector, as is done in the prior art systems, a truncated version of this number is stored in a buffer register in BER storage 23 for subsequent encoding and transmission to the master BER monitor equipment 30. In the preferred embodiment, the most significant digit (in this example a 1) and the exponent (a $-7$) are extracted via path 66 and loaded in the local BER storage register 23. When an enable signal from program monitor 19 is received over the service channel facility, it is applied via paths 71 and 70 to an enable input of BER storage 23. This triggers BER storage register 23 to read out the current truncated version of the particular BER accessed as an 8-bit parallel word. The service channel interface 25 encodes the digital word representing the most significant digit and the exponent of the BER into a serial data for further processing by the service channel equipment.

The encoded signal on path 72 is applied through the transmit portion of the service channel signalling equipment 24 to an input of the radio interface 9. Radio 9 upconverts the service channel signals and transmits them over the E-W microwave path 38 to the West Terminal 1 where the current BER information is demultiplexed and decoded before being dropped out to master BER store 18, thereby updating the BER information available for that location (repeater 2), channel, and direction. That BER information is stored in the particular register (memory location) for that station, channel and location.

Alternatively the local BER information stored in buffer register 23 may be accessed by the local BER access keyboard 26. In virtually the same manner that the program monitor keyboard 19 accesses the local BER data, keyboard 26 initiates a transfer causing the data to be displayed on the local BER display unit 27. (This access capability is useful to maintenance personal wishing to locally check the BER data for a particular channel.) Certainly there are numerous ways that the BER monitor equipment (29 and 28) could be implemented. For example since the data on path represents a two-digit number, which is stored for future retrieval, the keyboard 26, display 27, and storage unit 23 could be implement with a personal computer terminal. Since this would be wasteful of its capabilities, a customized dedicated unit would be a preferred structure from an economic standpoint. An example of such dedicated circuitry is made by Fujitsu Limited of Tokyo, Japan which manufactures the error detector 22 and storage unit 23 as a single "scan unit" (H16C-8004-J220). The same company makes the service channel interface 25 (as "sequence unit" H16-8004-J230).

From a system point of view, the maintenance technician located at the West Terminal 1 has the capability of periodically monitoring the approximate BER of each link within the system. In a very long repeatered system the BER will increase from one span to the next. However, the increase from one span to the next should be gradual and should only change slowly in time. By monitoring the approximate BER from one monitored span to the next over a long period of time, the technician can develop a fairly good idea of the performance of the digital system. If however, one span starts to increase with time dramatically, this is an indication that some piece of equipment is perhaps begining to malfunction. (Microwave path fades can readily be distinguished, by experienced maintenance personnel, from the system malfunctions which would deliteriously affect the BER. For example since a fade should affect the BER in both transmission directions, by checking the approximate BER in both directions the fade problem can be distinguished from the other equipment failure problems.) This knowledge enables maintenance personnel to troubleshoot the system, locate the potentially defective unit, and replace it from available spares, and thereby avoid a system shutdown at an inappropriate time.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a digital telecommunication system having at least two end terminals, apparatus for monitoring the BER (bit error rate) of the transmitted digital signals, which comprises:
    means for periodically detecting the BER at each terminal in the system,
    means for truncating the detected BER at each terminal such that at least the most significant digit and the exponent of said detected BER are included,
    means for encoding said truncated BER for transmission to one of said terminals,
    transmitting means at each terminal for transmitting said encoded truncated BER to said one terminal,
    receiving means at said one terminal for receiving said transmitted encoded truncated BER,
    means at said one terminal for decoding said encoded transmission to derive said truncated BER, and
    first storage means at said one terminal for storing said truncated BER from each terminal and for providing an output that is representative thereof, and thereby providing in-service line monitoring to detect marginal and failed transmission equipment.

2. Apparatus as in claim 1 wherein said truncating means further comprises:
    second storage means for storing only the most recent truncated BER.

3. Apparatus as in claim 2 further including a program monitor at said one terminal which is adapted to separately address each of said terminals to request transmission of said truncated BER from the addressed terminal.

4. Apparatus as in claim 3 wherein said program monitor automatically addresses each terminal in a sequence.

5. Apparatus as in claim 4 wherein said truncated BER equals the most significant digit and the exponent of said detected BER.

6. Apparatus as in claim 5 further comprising:
    third storage means at said one terminal for storing only the most recent truncated BER received by said receiver means from each of said terminals.

7. Apparatus as in claim 6 further comprising:
    display means at said one terminal for accessing and displaying said truncated BER stored in said third storage means.

8. In a digital repeatered communication system having two end terminals and at least one repeater, apparatus for monitoring at each repeater and terminal location the BER of the transmitted digital signals which comprises:
    means for periodically detecting the BER at predetermined terminal and repeater locations,
    means for truncating the detected BER at said locations including at least the most significant digit and the exponent of said detected BER,
    means for encoding said truncated BER for transmission to one of said terminals,
    transmitting means at each terminal and repeater location for transmitting said encoded truncated BER to said one terminal,
    receiver means at said one terminal for receiving said transmitted encoded truncated BER,
    means of said one terminal for decoding said encoded transmission to derive said truncated BER, and
    first storage means at said one terminal for storing said truncated BER from each of said predetermined terminal and repeater location and for providing an output that is representative thereof for each such location, and thereby providing in-service line monitoring of each monitored span link.

9. Aparatus as in claim 8 further comprising:
    second storage means at each of said predetermined terminal and repeater locations for storing said truncated BER prior to encoding and transmission.

10. Apparatus as in claim 9 further comprising:
    display means coupled to the output of said first storage means for displaying said stored truncated BER.

11. Apparatus as in claim 10 further comprising:
    means for accessing selectively each of the storage locations in said first storage means and for writing the contents of the storage into said display means to display the stored truncated BER so accessed.

12. Apparatus as in claim 11 further comprising:
    means at said one terminal for separately addressing each of said storage locations in said first storage means to cause the encoding and transmission of said stored truncated BER from the addressed location to said decoding means at said one terminal.

13. Apparatus as in claim 12 wherein and truncated BER equals the most significant digit and the exponent of said detected BER.

14. Apparatus as in claim 13 wherein said predetermined locations is each of said terminal and repeater locations.

* * * * *